United States Patent [19]

Schopper et al.

[11] Patent Number: 4,488,742
[45] Date of Patent: Dec. 18, 1984

[54] CONNECTING ARRANGEMENT, ESPECIALLY FOR TUBULAR ELEMENTS

[75] Inventors: Bernd Schopper, Hattersheim; Peter Tandler, Falkenstein; Derek Lowe, Glashüetten, all of Fed. Rep. of Germany

[73] Assignee: ITT Industries, Inc., New York, N.Y.

[21] Appl. No.: 352,409

[22] Filed: Feb. 26, 1982

[30] Foreign Application Priority Data

Mar. 28, 1981 [DE] Fed. Rep. of Germany ....... 3112309

[51] Int. Cl.³ ............................................ F16L 37/26
[52] U.S. Cl. .................................... 285/325; 285/356
[58] Field of Search ................ 285/325, 27, 393, 327, 285/326, 103, 67, 356

[56] References Cited

U.S. PATENT DOCUMENTS

| | | | |
|---|---|---|---|
| 1,564,965 | 12/1925 | Kraft | 285/327 |
| 2,916,306 | 12/1959 | Rickard | 285/393 X |
| 3,941,409 | 3/1976 | Rameau | 285/325 X |
| 4,037,654 | 7/1977 | Lien | 285/325 X |
| 4,113,284 | 9/1978 | Blocker | 285/393 X |

FOREIGN PATENT DOCUMENTS 862370  3/1941  France ................ 285/325
1350361 12/1963  France ................ 285/325
16086 of 1904  United Kingdom ........ 285/327

*Primary Examiner*—Thomas F. Callaghan
*Attorney, Agent, or Firm*—James B. Raden; Edward J. Brosius

[57] ABSTRACT

A connecting arrangement for connecting two hollow components of a hydraulic circuit to one another, especially a pipe or hose to a mating component, includes a guiding formation on one of the components, especially the mating component, and a mounting formation connected to the other component, these formations having correlated cross-sectional shapes such that the guiding formation guides the mounting formation in a predetermined direction, especially the longitudinal direction of the one component, and prevents relative displacement in all other directions. The mounting formation is advantageously constituted by a separate mounting element which is affixed to the other component by a threaded connection, such as by a screw cap. The formations advantageously have complementary dovetail-shaped cross-sectional configurations. The formations have respective passages which register with one another in the assembled position of the components and which are surrounded by a seal arranged in the interface between the components.

5 Claims, 2 Drawing Figures

CONNECTING ARRANGEMENT, ESPECIALLY FOR TUBULAR ELEMENTS

BACKGROUND OF THE INVENTION

The present invention relates to a connecting arrangement for components with internal passages which are to sealedly communicate with one another across an interface between the components in an assembled position of the components, and more particularly to connecting arrangement to be used in hydraulic circuits for connecting tubular elements, such as hoses or pipes, to mating components.

In conventional connecting arrangements for pipes, hoses and similar conduits, one end of the conduit is provided with a screw coupling and a first seat, while a mating component is provided with a connecting bore and a second seat against which the first seat is urged by the screw coupling.

Such connecting arrangements or fittings for pipe and hose conduits have been widely known and used already for a long time. In a screw coupling of this kind, the connecting thread on the mating component is required to be so dimensioned that the torque necessary for efficiently sealing the fitting is transmitted by the threads without damaging the latter. It is, therefore, a common practice to arrange on the mating component, for example a slave or a master cylinder, threaded sockets radially projecting from the housing of the mating component. Such threaded sockets located at the housing of the mating component complicate the manufacture of the mating component. If, for instance, the mating component is to be made from an elongated extruded or extrusion molded preform, it is necessary to provide the housing with a profiled portion extending over the entire length of the mating component and having a cross section corresponding to the cross section of the threaded socket as a result, optimum material economy is not possible. The increased material consumption incurred thereby results in increased manufacturing costs as well as in a high weight of such a mating component, which is hardly justifiable nowadays.

SUMMARY OF THE INVENTION

Accordingly, it is a general object of the present invention to avoid the disadvantages of the prior art.

More particularly, it is an object of the invention to provide a connecting arrangement for components having respective internal passages which sealedly communicate with one another in the assembled condition of the components, which does not possess the drawbacks of the conventional connecting arrangements of this type.

Still another object of the present invention is to develop a connecting arrangement of the type here under consideration which is especially suited for use in connecting hoses or pipes of hydraulic circuits to respective associated mating components.

It is yet another object of the invention to so construct the connecting arrangement as not to require the provision of any threads or superfluous material portions on the mating component.

An additional object of the present invention is to so design the connecting arrangement as to be able to manufacture the mating component in an extrusion operation.

It is a concomitant object of the invention to devise a connecting arrangement of the above type which is simple in construction, inexpensive to manufacture, easy to use, and reliable in operation nevertheless.

In pursuance of these objects and others which will become apparent hereafter, one feature of the present invention resides in a connecting arrangement for components having respective internal passages which sealedly communicate with one another across an interface between the components in an assembled position of such components, especially for use in hydraulic circuits, which comprises a mounting formation on one of the components having at least two engagement surface sections transversely spaced from the respective passage; and a guiding formation on the other component having at least two guiding surface sections extending substantially along the interface and respectively engaging the engagement surface sections for guiding the one component into and for holding the same in the assembled position.

The guiding surface sections thus constitute guiding means which prevents displacement in all other directions but in the intended direction of displacement. It will be thereby attained that the one component can be connected to a mating component of a lower strength, for example aluminum or plastics, without causing inadmissibly high stresses in this area.

The one component may advantageously include at least one tubular element, such as a hose or a pipe, a mounting element separate from the tubular element and having the mounting formation and threaded connecting means interconnecting the tubular and mounting elements. The separate mounting element simplifies the manufacture, and the material thereof can be selected independently of the requirements to be met by the material of the mating component. So, for instance, the material of the mounting element may be so selected as to allow manufacture of the supporting thread pitches thereon in a particularly favorable and durable manner. In a connecting arrangement of this kind, threaded couplings may be used which are commonly known and conform to the various requirements encountered in hydraulic systems, for example cap screws and coupling nuts in connection with pipe conduits or hose fittings in connection with hoses.

Further simplification of the connecting arrangement is achieved when the mating component includes recesses or projections at least partially bounded by the guiding surfaces and extending in the direction of the longitudinal axis of the mating component. It will be thereby obtained that the outward contour remains constant throughout the axial length of the mating component, rendering if possible to manufacture such mating components, for example slave or master cylinders, in extrusion or extrusion molding processes. The manufacture of such extruded articles is extremely economical and advantageous with respect to costs. Special mechanical machining of the recesses or of the projections will no longer be necessary. It will be particularly expedient in comparatively long mating components that the guiding formation is formed by longitudinally extending recesses because optimum material economy in manufacture will result. However, it is also possible to provide the guiding formations in previously molded or cast components by a machining process, for instance, by punching, drawing or broaching.

In a preferred embodiment of the present invention, the formations provided on the separate mounting element and on the mating component have complementary dovetailed cross sections. The dovetailed profiles are so configurated as to enable connection between the separate mounting element and the mating component by displacement relative to one another. The separate mounting element is adapted to be inserted in an extremely simple way into the projections and/or recesses of the mating component and is affixed to the mating component by the threaded coupling. The two seats will thereby be urged against each other so tightly that a sealed connection is established between the pipe or hose conduit and the mating component. The reaction force generated by the torque applied to the threaded coupling is transmitted via the thread of the separate mounting element to the engagement and guiding surfaces provided on the cooperating projections and recesses. In this arrangement, the engagement surfaces formed on the separate component are advantageously dimensioned so large that the material stress of the mating component does not exceed the admissible values. A profiled connection of this type is very efficient in practice. The flat surfaces are easy to manufacture. Even considerable variations in tolerances in the dovetailed profile can be compensated for when fitting the mating component to the separate component.

Advantageously, the recesses or projections extend over only a part of the length of the mating component. This arrangement will afford special advantages in cast or molded mating components, since it reduces their weight. In accordance with another facet of the present invention, the separate mounting element contains several fittings. An arrangement of this construction is particularly advantageous if several fittings are located on a common block. However, it is also conceivable that merely one separate mounting element communicates with fittings arranged at any desired location of the mating component.

It will be further advantageous to provide the recess or the projections on a strip of the mating component. An arrangement of this kind is particularly suited for use on thin-walled mating components.

It will be furthermore advantageous when the base of the mounting formation of the separate mounting element is flat and cooperates with a flat surface of the mating component, while a sealing member arranged between these surfaces surrounds the seats. This serves to prevent corrosion of or other damage to the seats due to atmospheric influences.

Expediently, a seat is provided at the base of the guiding foundation of the mating component which is arranged in an indentation in the mating component. This not only simplifies the assembly of the fitting but also provides positive engagement of the fitting with the mating component.

BRIEF DESCRIPTION OF THE DRAWING

Above-mentioned and other features and objects of this invention will become more apparent by references to the following description taken in conjunction with the accompanying drawing, in which.

DETAILED DESCRIPTION OF THE PREFERRED EMBODIMENTS

Figure 1:
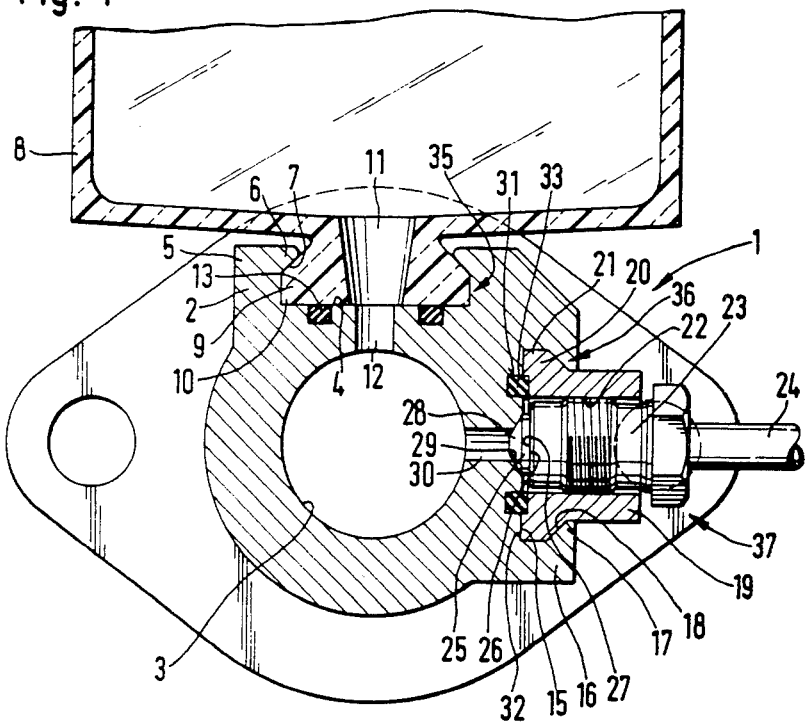
FIG. 1 is a cross-sectional view of a master cylinder equipped with a fitting according to the invention conduit.

Referring now to the drawing in detail, and first to FIG. 1, it may be seen that the reference numeral 1 has been used to identify a master cylinder. The master cylinder 1 comprises a housing 2 which is extrusion molded or extruded of aluminium or any other suitable material and includes a bore 3 which is closed at its one end by a caulked plug which is not shown. A piston, which is not shown in the drawing, operates in the bore 3 as is conventional practice. An upper surface 4 of the housing 2 of the master cylinder 1 is flat and has two protruding shoulders 5 with inwardly extending flanges 6 which form respective longitudinally oriented recesses 7. The shoulders 5 and their flanges 6 constitute a first guiding formation 35. A supply reservoir 8 has a downwardly protruding foot 9 having projections 10 which are disposed opposite to one another, facing outwardly and extending in a longitudinal direction. The projections 10 fit into the recesses 7 of the master cylinder 1. The foot 9 and its projections 10 form a first mounting formation. The foot 9 has an opening or passage 11 serving as an outlet. The opening 11 is associated with a compartment of the master cylinder 1 and is so designed as to register with an opening 12 of the master cylinder 1 serving as an inlet or outlet opening. The opening 12 is surrounded by a groove in which a sealing member 13 is located. The sealing member 13 bears against the upper surface 4 of the housing 2.

To mount the supply reservoir 8 on the master cylinder 1, it will be only necessary to slide the supply reservoir 8 onto the housing 2 of the master cylinder 1 in such a manner that the projections 10 engage in the associated recesses 7. A stop 14 illustrated in FIG. 2 ensures that the supply reservoir 8 is arranged in the correct position shown in FIG. 1, in which the opening 11 registers with the opening 12 of the master cylinder 1.

A second guiding formation 36 located displaced by 90° relative to the first guiding formation 35 on the master cylinder 1 has a flat surface 15 arranged at which are two protruding shoulders 16 with inwardly facing flanges 17 which form respective longitudinally extending recesses 18. A separate mounting element which constitutes a second mounting formation has downwardly protruding feet 20 having projections 21 which are disposed opposite to one another, facing outwardly and extending in longitudinal direction and which fit into the recesses 18 of the master cylinder 1. Threaded in a taphole 22 of the separate mounting element 19 is a cap screw 23 penetrated by a pipe conduit 24. The pipe conduit 24 is, for instance, connected to a non-illustrated wheel cylinder of a disc or a drum brake of a vehicle. A conical beaded collar 25 is provided at the end of the pipe conduit 24. An end surface 26 of the collar 25 abuts an end surface 27 of the cap screw 23. The cap screw 23 urges a conical seat 28 of the beaded collar 25 onto its complementary seat 29 provided on the master cylinder 1. Thus, the pipe conduit 24 communicates with the bore 3 via a bore 30 arranged in the master cylinder 1. The seat 29 is surrounded by a groove 31 in which a sealing member 33 acting on an end surface 32 of the separate mounting element 19 is received.

To mount the threaded coupling on the master cylinder 1, it will be only necessary to slide the separate mounting element 19 onto the housing 2 of the master cylinder 1 in such a manner that the projections 21 engage in the associated recesses 18. Subsequently, the cap screw 23 will be threaded onto the separate mounging element 19 whereby the beaded collar 25 is urged against the seat 29 of the master cylinder 1. The reaction force resulting therefrom is transmitted to the projections 21. This provides for a positive and frictional engagement of the fitting 37.

Figure 2:
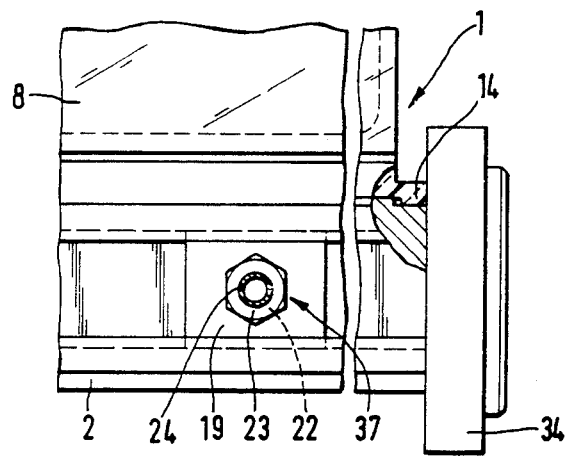
FIG. 2 is a partial plan view of the master cylinder of FIG. 1.

A flange 34 illustrated in FIG. 2 of the drawing has a non-illustrated opening conforming in shape to the outward contour of the master cylinder 1 which receives an end portion of the master cylinder 1 when the flange 34 is slid onto the master cylinder 1. The flange 34 is secured in this position, for example, by welding or caulking. The separate mounting element 19 is shown in FIG. 2 to have a rectangular cross section.

While we have described above the principles of our invention in connection with specific apparatus, it is to be clearly understood that this description is made only by way of example and not as a limitation to the scope of our invention as set forth in the accompanying claims.

We claim:

1. Apparatus for connecting at least one fluid flow fitting onto a housing having a fluid bearing bore therein to provide communication between said fitting and said bore, said housing including a passage leading from said bore to the exterior of said housing, a shaped recess in said housing symmetrically disposed relative to said passage, said fluid flow fitting comprising an insert component having outwardly extending projections shaped to be matingly received in said recess in a slide fit relationship along a surface of said recess normal to said passage thereby to mount said fitting in said housing, said insert component including a tapped bore therethrough for communicating with said passage, a frusto conic exit seat from said passage tapering outwardly to said surface, an externally threaded conduit adapted to be mated into said tapped bore, a conical beaded collar driven by a cap screw into said seat to lock said insert component against slide movement relative to said housing and providing a fluid transmission path from the housing bore to said conduit.

2. Apparatus as claimed in claim 1, in which there is seal means in the surface of said recess for sealing to said insert component externally of the exit seat to prevent fluid flow from said seat other than to said conduit.

3. Apparatus as claimed in claim 1, in which said housing has a second recess angularly spaced from said first recess, a passage opening from said housing bore to said second recess, said second recess comprising a base surface through which said opening passes and side walls equal distances from said opening, a fluid reservoir, a foot extension of said reservoir extending therefrom with like projections adapted to slidingly mate in said second recess with the recess walls confining the reservoir to slide movement relative to the housing to thereby mount said reservoir on said housing, an outlet passage through the foot of the reservoir alignable with said passage opening of said housing in the slide movement of the reservoir relative to the housing to permit fluid flow from the reservoir to the housing through the aligned passages.

4. Apparatus as claimed in claim 3, in which there is a stop on said housing for preventing further slide movement of the reservoir with the passages in mutual alignment.

5. Apparatus as claimed in claim 3, in which said reservoir outlet passage tapers inwardly from the reservoir, and in which said reservoir is mounted to enable gravity flow of fluid from the reservoir supply to the housing bore.

* * * * *